3,503,719
HETEROLYTIC FISSION OF ELEMENTARY FLUORINE IN THE PREPARATION OF AN ADDUCT OF FLUORINATED LEWIS BASES WITH LEWIS ACIDS
Karl O. Christe, Berkeley, Jacques P. Guertin, Pinole, and Attila E. Pavlath, Berkeley, Calif., assignors to Stauffer Chemical Company, New York, N.Y., a corporation of Delaware
No Drawing. Filed Mar. 1, 1967, Ser. No. 619,545
Int. Cl. C01b 27/00, 27/02; C06d 5/00
U.S. Cl. 23—315               8 Claims

ABSTRACT OF THE DISCLOSURE

The process is the heterolytic fission of elementary fluorine by the co-action of a highly fluorinated Lewis acid and a high'y fluorinated Lewis base in the presence of an activation energy source forming an adduct of the three components. Representative of the adducts is the adduct prepared from $NF_3$, $F_2$, and $AsF_5$, namely, tetrafluoronitrogen(V) hexafluoroarsenate(V), represented by the structural formula, $[NF_4^+AsF_6^-]$. The preparation is carried out in the presence of an electric discharge as the activation energy source. The compounds are useful as oxidizing components in rocket propellants, as oxidizers, and as fluorinating agents for organic compounds.

---

This invention relates to adducts of highly fluorinated Lewis acids, elementary fluorine, and highly fluorinated Lewis bases, and to a process for the preparation of said adducts.

A general object of the present invention is to provide a new class of chemical compounds and a process for its preparation in which the heterolytic fission of elementary fluorine is conducted by the co-action of a highly fluorinated Lewis acid and a highly fluorinated Lewis base in the presence of an activation energy source. Accordingly, the following general equation is representative of the process and the compounds produced thereby:

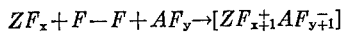

$$ZF_x + F - F + AF_y \rightarrow [ZF_{x+1}^+ AF_{y+1}^-]$$

The Lewis base represented by $ZF_x$ in the equation is characterized by having at least one free electron-pair on the central atom Z. However, this Lewis base must not necessarily contain only fluorine atoms in addition to Z. Other substituents generally used compatible with the strongly oxidizing conditions, are oxygen, nitrogen, sulfur, halogen, pseudohalogen, and the like. Furthermore, the Lewis base can be generated in situ (as for example, $NF_3$ from $N_2$ and $F_2$) and need not be prepared in a separate step prior to the actual heterolytic fission reaction of elementary fluorine. The central atom, Z, of the Lewis base can be selected from the 5, 6, 7, or 8 main groups of the periodic system. Examples of highly fluorinated Lewis bases are $NF_3$, $OF_2$, $ClF_3$, $ClF_5$, $BrF_5$ and $PF_3$, and the like. The Lewis acid, $AF_y$, is typically represented by Lewis acids, such as $BF_3$, $PF_5$, $AsF_5$, $SbF_5$, and the like. The ligands around the central atom, A, are not limited to fluorine only. Other substituents, such as oxygen, nitrogen, sulfur, halogen, pseudohalogen, and the like are operable.

The above-mentioned invention can be exemplified by the adduct of $NF_3$, $F_2$, and $AsF_5$ and by a process for preparing said adduct. More specifically, this is the compound, tetrafluoronitrogen(V) hexafluoroarsenate(V), represented by the structural formla, $[NF_4^+AsF_6^-]$, and the process for preparing said compound from $NF_3$, $F_2$, and $AsF_5$.

Before this invention there was no known derivative of the hypothetical compound, $NF_5$. As a result of the present invention the adduct, $[NF_4^+AsF_6^-]$, was prepared for the first time. This compound is a white, crystalline powder, stable and nonvolatile at 25° C., and decomposes exothermically at about 270° C. It is useful as a fluorinating agent and as an intermediate for the preparation of other chemical compounds. The compound has excellent oxidizing power and finds utility as a component in rocket propellants as an oxidizer, especially in solid propellant systems.

Generally, the compound of this invention can be prepared by exposing $NF_3$, $F_2$, and $AsF_5$ to an activation energy source such as heat, electric discharge, microwave discharge, radiation, and the like. It is preferred to expose the $NF_3$, $F_2$, and $AsF_5$ in their gaseous state to an electric discharge.

The compound of this invention can be prepared in accordance with the following example:

EXAMPLE

Nitrogen trifluoride (98% purity) and the arsenic pentafluoride (98% purity) were purified by several low-temperature vacuum distillations. The fluorine (98% purity) was further purified by passing it through a hydrogenfluoride absorber. The three reactants were stored separately at 25° C. in 300 ml. Monel cylinders.

The electric discharge apparatus consisted of a cylindrically-shaped Pyrex-glass electric-discharge reaction vessel containing two copper discs spaced about 50 mm. apart each 20 mm. diameter and 5 mm. thick. The discs served as the electrodes for the apparatus and were held within the reaction vessel by lead wires which passed through the top and bottom of the reaction vessel to a high voltage transformer, primary 120 volts, 60 cycles; secondary 15 kilovolts, 30 milliamps with midpoint of secondary grounded. The reaction vessel was fitted near the top and botom with Pyrex-glass tubing. This tubing was connected to a pump which comprised a piece of Pyrex tubing with a 20 mm. inside diameter which served as a cylinder and a 20 mm. hollow-glass plunger about 4 inches long filled with powdered iron and sealed off, which plunger was positioned inside said tubing to serve as a piston. The plunger was thrown alternately back and forth by alternately energizing two air-cooled solenoids placed around the aforesaid Pyrex tubing.

$[NF_4^+AsF_6^-]$ was prepared by introducing the purified nitrogen trifluoride, arsenic pentafluoride, and fluorine gases (1:1: about 2) mole ratio into the electric discharge apparatus at a maximum pressure of about 80 mm. The circulating pump was operated at about 12 strokes per minute. The reaction vessel was cooled to about −78° C. by surrounding it with a Dry Ice slush of a 50:50 mixture of carbon tetrachloride and chloroform. Next a 15 kilovolt potential was placed across the electrodes, resulting in an electric discharge.

The reaction was continued until the pressure had decreased to about 10 mm., indicating substantial reaction of the reactants. At this time another similar mixture of the reactants was introduced, and the reaction continued until the pressure decreased again to about 10 mm. Additional mixtures of the gases were introduced and reacted as described until about 1 gram of a white nonvolatile solid was obtained. The compound was found to be a hygroscopic, crystalline powder, storable in glass at 25° C., and having a solubility in liquid hydrogen fluoride of about 0.2 gram per ml. at 25° C. Differential thermoanalysis indicated initial decomposition at about 270° C.

*Analysis.*—Calculated for $NAsF_{10}$ (percent): As, 26.9; F, 68.1. Found (percent): As, 26.9; F, 66.2.

An instrumental analysis of the solid product from the reaction of $NF_3$, $F_2$, and $AsF_5$, by Intra-red, Raman, and $^{19}$F magnetic resonance spectroscopy, confirmed that the NF$_3$, F$_2$, and AsF$_5$ had reacted in a 1:1:1 mole ratio to form the ionic compound having the structure $$[NF_4^+AsF_6^-]$$

The Lewis base, NF$_3$, used in the above example, was replaced by stoichiometric amounts of elementary nitrogen and fluorine for its in situ preparation. The reaction was carried out in a similar manner and the product was found to be identical.

Although the NF$_3$, F$_2$ and AsF$_5$ have been formed to react in a 1:1:1 mole ratio, it is preferred to use an excess of fluorine in the reaction. The excess is needed, especially when the reaction is run in Pyrex-glass equipment, because fluorine reacts with the materials of the reaction equipment thus reducing the amount of fluorine available for reaction with the NF$_3$ and AsF$_5$. If the fluorine is found not to react with the materials of the reaction equipment, then no excess would be required.

Although the NF$_3$, F$_2$ and AsF$_5$ will react in the process of this invention at any temperature, it is preferred to run the reaction at temperatures between 0° C. and —100° C. These low temperatures of reaction reduce the impurities in the [NF$_4^+$AsF$_6^-$] reaction product.

In the process of this invention, it is desirable to evacuate the reaction equipment of air before introducing the gaseous reactants. The pressure at which the reaction is run is not critical. The reaction can be run at sub-atmospheric, atmospheric, and super-atmospheric pressures.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A process, comprising the heterolytic fission of elementary fluorine in the presence of a highly fluorinated Lewis acid and a highly fluorinated Lewis base to form an adduct thereof under the influence of an activation energy source.

2. The process according to claim 1, wherein said activation energy source is an electric discharge.

3. The process according to claim 1, wherein said Lewis base is nitrogen trifluoride.

4. The process according to claim 1, wherein said Lewis base is nitrogen trifluoride and said Lewis acid is arsenic pentafluoride.

5. A process for preparing tetrafluoronitrogen(V) hexafluoroarsenate(V), [NF$_4^+$AsF$_6^-$], comprising exposing nitrogen trifluoride, elementary fluorine and arsenic pentafluoride to an activation energy source to form said [NF$_4^+$AsF$_6^-$].

6. The process of claim 5 wherein the reaction of nitrogen trifluoride, elementary fluorine and arsenic pentafluoride is carried out at a temperature range of about 0° C. and —100° C. and said energy activation source is an electric discharge.

7. The process of claim 6 wherein said nitrogen trifluoride is prepared in situ from a stoichiometric amount of fluorine and nitrogen.

8. The composition of matter, tetrafluoronitrogen(V) hexafluoroarsenate(V), [NF$_4^+$AsF$_6^-$].

References Cited

UNITED STATES PATENTS

| | | | |
|---|---|---|---|
| 3,256,169 | 6/1966 | Berghaus et al. | 204—177 |
| 3,392,099 | 7/1968 | Fox et al. | 204—177 |
| 3,428,540 | 2/1969 | Fox et al. | 204—177 |

ROBERT K. MIHALEK, Primary Examiner

U.S. Cl. X.R.

204—164, 177